R. B. BRASHEAR.
Treating Cane Juice.
No. 2,781. Reissued Oct. 22, 1867.
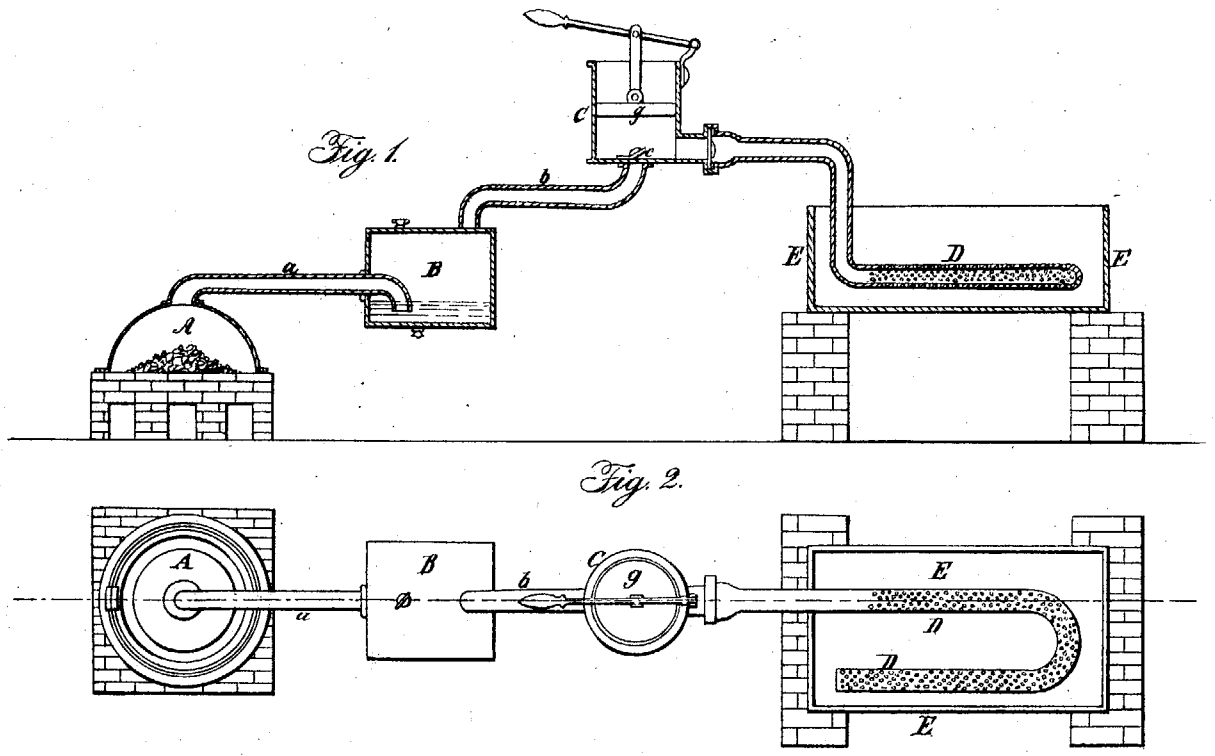
Witnesses:
Edw. Shafer,
John Kingdon.
Inventor:
Percy Bordeaux Brashear
by his Atty
Wilson, Hurlbert & Kenney.
AM. PHOTO-LITHO. CO. N.Y. (OSBORNE'S PROCESS.)

UNITED STATES PATENT OFFICE.

NANCY POINDEXTER BRASHEAR, OF PATTERSONVILLE, LOUISIANA, EXECUTRIX OF THE ESTATE OF ROBERT B. BRASHEAR, DECEASED.

IMPROVED MODE OF APPLYING SULPHUROUS-ACID GAS IN THE DEFECATION OF SACCHARINE LIQUIDS.

Specification forming part of Letters Patent No. 26,401, dated December 6, 1859; Reissue No. 2,781, dated October 22, 1867.

*To all whom it may concern:*

Be it known that ROBT. B. BRASHEAR, (deceased,) late of Pattersonville, in the parish of St. Mary and State of Louisiana, did invent an improved mode of applying sulphurous-acid gas in the defecation of cane-juice and other saccharine liquids, for which Letters Patent of the United States were issued to NANCY POINDEXTER BRASHEAR, his legal executrix; now, therefore, I, the said NANCY POINDEXTER BRASHEAR, do hereby declare that the following is a full, clear, and exact description thereof, reference being had to the accompanying drawings, making part of this specification, in which—

Figure 1 is a vertical longitudinal section of one form of apparatus which is adapted for carrying the invention into effect. Fig. 2 is a top view of this apparatus.

Similar letters of reference indicate corresponding parts in both figures.

The object of this invention is to facilitate in a cheap, expeditious, and perfect manner the clarification and defecation of saccharine liquids by subjecting such liquids to the direct action of the fumes of burning sulphur or sulphurous-acid gas, in such manner that every portion, or nearly every portion of the same, is brought into immediate contact with the fumes at the same or very nearly the same moment of time, whereby that mutism of the juice is produced which renders its subsequent clarification and defecation easy, as will be hereinafter described.

In the accompanying drawings an apparatus is represented which is adapted for forcing the fumes of sulphur into a body of saccharine juice, so as to thoroughly impregnate the juice with the fumes. Its operation is as follows: The sulphur is put into a kind of retort, A, of suitable size and construction, beneath which heat is applied for vaporizing the sulphur. The sulphurous fumes rise and pass over into a purifying-chamber, B, through a pipe, *a*, and are discharged into a body of water. This will deprive the fumes of all matter which might be injurious to the sugar. The chamber B communicates with the bottom of a force-pump or bellows, C, by means of pipe *b*, which is provided with a valve, *c*, opening upward into the cylinder of said pump or bellows. The cylinder of the pump or bellows C communicates with a pipe, D, which is finely perforated, and which is arranged in a suitable manner within a tank, E, which contains the saccharine liquid, as shown in Figs. 1 and 2, so that the perforated portion shall be submerged in the liquid contained in said tank. When fire is applied beneath the retort A, the sulphurous-acid gas will rise and pass over into the purifying-chamber B, from which this gas is drawn by elevating the piston *g* of the pump. When once in the cylinder of this pump, the valve *c* will prevent the gas from passing backward. By continuing the motion of the pump-piston the gas will be forcibly injected from the great number of holes through pipe D into the body of saccharine liquid contained in the tank E, and thus the operation may be continued until the juice is impregnated with the fumes to the desired extent.

It must be apparent that the mechanical means for applying this invention may be indefinitely diversified, and that in addition to the above-described mode the following ones are also adapted to the same purpose.

Instead of forcing the fumes of sulphur into the saccharine liquid, as first described, the same result may be accomplished, and the saccharine liquid impregnated to the desired extent with the fumes by forcing the saccharine liquid through a reticulated plate or substance, causing it to fall in a shower or spray through a space or vessel filled with the fumes; or the sulphur fumes may be forced through the saccharine liquid contained in stationary or revolving vats, provided with stirrers, after the manner of a churn, to induce diffusion; or in revolving cylindrical receivers either with or without a perforated perimeter; or it may be treated or subjected to the action of the fumes or gas from sulphur in any other suitable manner.

It is not intended to confine this invention to the mechanical means herein described, as other means which will produce the result desired may be employed in treating the juice to the action of sulphur fumes, either by passing the juice through the fumes or passing the fumes through the juice.

Now, I am well aware of the uses heretofore made by others of sulphurous-acid gas in the treatment of sugar-juices, in all of which processes mine differs from theirs in this, that in my invention I apply the fumes of sulphur directly and alone to the saccharine liquid, as described, by the aid of which, in an economic, perfect, and expeditious manner, the desired mutism of the juice is produced, which renders its subsequent defecation and clarification easy by the addition of any of the salts, earths, alkalies, or acids hitherto known in the manufacture of sugar, or by percipitation, filtration, skimming, or boiling of the juice.

Having thus described the invention of ROBT. B. BRASHEAR, I claim as new and desire to secure by Letters Patent—

1. The use of the fumes of burning sulphur or sulphurous-acid gas in the treatment of juices containing saccharine matter, substantially as described.

2. Subjecting sugar-cane juice or other saccharine liquid to the direct action of the fumes of burning sulphur, such liquid being employed in a diffused state, or in such manner treated that it will be thoroughly impregnated with the fumes of sulphus, substantially as described.

N. P. BRASHEAR,
*Executrix of the will of Robert B. Brashear, deceased.*

Witnesses:
HENRY GIBBON,
J. TODD.